Sept. 1, 1942.     M. B. HERBRICK     2,294,557
TRACTION DEVICE
Filed Aug. 19, 1940

Inventor
Milton B. Herbrick
By Arthur H. Sturges
Attorney

Patented Sept. 1, 1942

2,294,557

UNITED STATES PATENT OFFICE 2,294,557

TRACTION DEVICE

Milton B. Herbrick, Omaha, Nebr.

Application August 19, 1940, Serial No. 353,258

4 Claims. (Cl. 152—245)

This invention relates to anti-skid cross chains for vehicle tires.

It is an object of the invention to provide like roadway engaging members for the twist links of a cross chain which may be readily attached to and removed from links of the latter at times when said members become unduly worn.

Another object of the invention is to provide a device for the above stated purpose which is so constructed that when assembled upon and joined with a link said link is protected from road engaging wear.

A further object of the invention is to provide a device which in use is so assembled with a link of a cross chain that a loose connection is provided whereby different surfaces thereof engage with a roadway at different times for providing a device of comparatively long wearing characteristics.

A still further object of the invention is to provide a device which when assembled with a link of a cross chain will adequately protect said link and cooperatively provide additional anti-skid and wearing surface on all sides of said link whereby links of cross chains of the present invention provide a maximum anti-skid protection to a user thereof even under abnormal operating conditions and particularly during starting and stopping of a vehicle.

Other and further objects and advantages of the invention will be understood from the following detailed description thereof, reference being had to the accompanying drawing in which.

Figure 1:
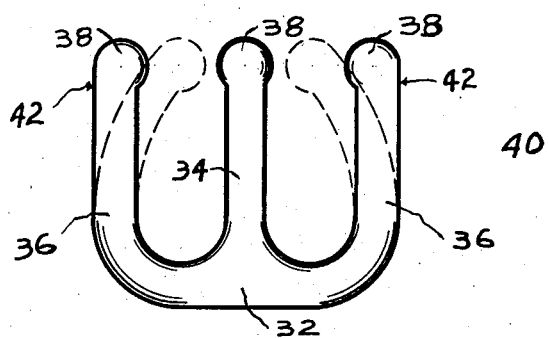
Figure 1 is a plan view showing in full lines the contours in plan of the new device prior to an attachment thereof to a tire chain link.
Figure 2:
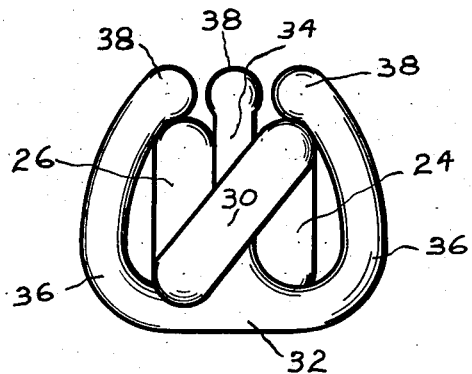
Figure 2 is a view similar to Figure 1 and showing the shape in plan of said device after an attachment thereof to a link.
Figure 3:
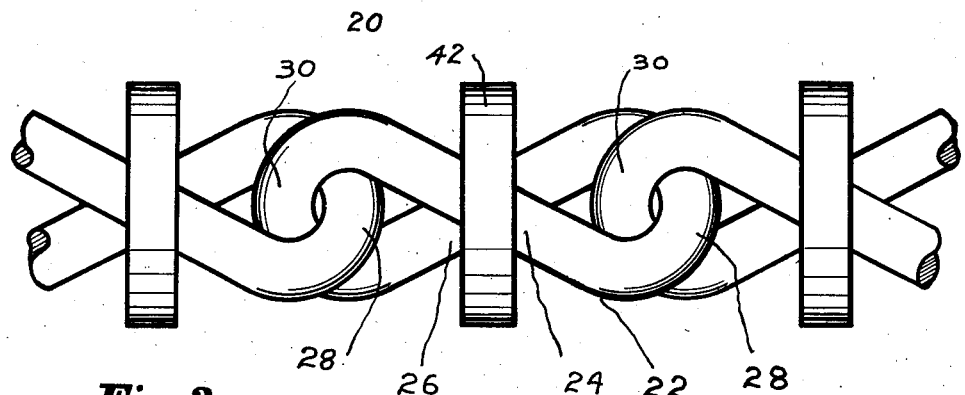
Figure 3 is a side elevation of a fragment of a cross chain for a tire and showing certain links thereof each provided with a roadway engaging member of the present invention, said members showing in side elevation, certain of said links being broken away.

Referring now to the drawing for a more particular description and first to Figure 3, 20 indicates generally a plurality of links of an anti-skid cross chain for a tire, said links being of twist type and joined together end to end for relative pivotal movements. The medial links of said chain which normally engage with a roadway are each provided with one device of the present invention.

The cross chain includes links such as the twist links 22, each of the latter being of elongated O-shape in plan, having an opening between the oppositely disposed sides 24 and 26 thereof. The closed ends 28 of said medial links are disposed through the closed ends 30 of the next adjacent link as shown in Figure 3.

The roadway engaging members of the present invention each includes a main body portion 32 having a medial shank portion 34 disposed approximately at a right angle with respect to said main body portion. At each end of the main body portion 32 an arm 36 is provided, said arms being of a length substantially equal to the length of the shank 34. At the outer free ends of said shank portion and arm portions flared enlarged portions 38 are preferably provided for increasing the wearing surface of said ends and also for facilitating an attachment of a device to a link as later described.

The new roadway engaging member generally indicated at 40 is initially produced from strips of heavy gauge metal by means of a blanking die at which time the normal position of the arms 36 with respect to each other and with respect to the shank 34 is such that said portions are in approximate parallelism and at right angles with respect to the main body portion 32, whereby a strip may be incised in a manner to conserve material by utilizing portions of said strip between the shank and arms for forming portions of further roadway engaging members from said strip. The method is such that said strip is caused to be moved under said die longitudinally for blanking said members from one longitudinal side of said strip; whereupon said strip is turned over and the operation repeated, the portions 32 of said members being derived from opposite side portions of said strip and the arms and shanks from portions of said strip between said side portions.

To attach roadway engaging members to a chain the latter is placed in a jig and shanks 34 of said members placed through the selected links of the chain; whereupon oppositely disposed rams of an assembling mechanism employed move toward each other and against the outer side-ends 42 of the arms 36 for bending said ends toward each other and toward the free end of the shank 34 to sufficiently close said free ends about their respective sides 24 and 26 of a link 22 whereby the roadway engaging members are individually attached to individual links.

As thus described it will be noted that each roadway engaging member is loosely attached to its link in a manner whereby said members are permitted to slide backward and forward towards each end of their links, while at the same time said members are permitted to sway from side to side and define wabbling and oscillating movements during use whereby different wearing surfaces of each of the members 40 are presented to the roadway at different times for increasing the durability of said members.

The length of a shank 34 in conjunction with the width of the main body portion 32 of each said member is such that said length is greater than the distance between the inner curve of the end portions 28 and 30 of a link at the time when said inner curves are approximately filled with the end portion of a next adjacent link whereby said shanks prevent a complete turning movement and permit a wabbling movement in an arc of substantially 45 degrees while also permitting sliding movements of said members upon and with respect to their respective links back and forth longitudinally for presenting different surfaces of said members to the surface of a roadway at different times during use for increasing the wearing qualities and lengthening the period of usefulness of said members.

It will be noted that when worn through a device will fall off from a link whereupon a new device may be readily attached to said link, the construction being such that a common household vise may be employed for said purpose. The jaws of said vise being used to compact and bend the arms 36 of a device toward each other between said jaws for loosely securing said device to a link.

If desired and for certain uses the member or article 40 may be welded to a link of a chain in an advantageous position with respect to said link.

It is obvious that various changes and modifications may be made in the details of construction and design of the above specifically described embodiments of this invention without departing from the spirit thereof, said changes and modifications being restricted only by the scope of the invention as claimed.

I claim:

1. A traction chain comprising a plurality of elongated twist links joined together for relative pivotal movement and a plurality of roadway engaging members carried by said links, each of said members comprising a substantially W-shaped member having a main body portion having a medially disposed shank portion extending loosely through the opening in a link, said main body portion also having a pair of arms disposed at opposite ends of said main body portion and extending convergently toward the free end of said shank portion about its respective side of its respective link for loosely securing said members to their respective links to permit turning and sliding movements thereof.

2. A traction chain as defined in claim 1, the free ends of the shank portions and arm portions of which are each provided with a flared enlargement.

3. A traction device for use with a tire chain, comprising a W-shaped metallic member having an elongated main body portion, an arm portion at each end of said body portion and a shank portion between said arms, said shank and arm portions being normally disposed in parallelism and at right angles with respect to said body portion, said shank and arm portions having their ends provided with enlargements adapted when the arms are bent into converging relation with the shank and about a portion of the tire chain, to cooperate to engage the tire chain and loosely secure the traction device thereto.

4. An article of manufacture for use with a tire chain comprising a metallic traction device of substantially W-shape in plan having a main body portion, an arm portion disposed at each end of said body, and a shank portion extending from said body intermediate said ends, said shank, body and arm portions being disposed in a common plane, said shank and arm portions having their ends provided with enlargements, whereby when the arms are bent into converging relation with the shank the enlarged end portions of the arms and shank will cooperate to engage a tire chain and loosely secure the traction device thereto.

MILTON B. HERBRICK.